United States Patent
Bjøntegaard

(10) Patent No.: US 7,283,588 B2
(45) Date of Patent: Oct. 16, 2007

(54) DEBLOCKING FILTER

(75) Inventor: Gisle Bjøntegaard, Oppegard (NO)

(73) Assignee: Tandberg Telecom AS, Lysaker (NO)

( * ) Notice: Subject to any disclaimer, the term of this patent is extended or adjusted under 35 U.S.C. 154(b) by 0 days.

(21) Appl. No.: 11/250,187

(22) Filed: Oct. 13, 2005

(65) Prior Publication Data
US 2006/0078048 A1    Apr. 13, 2006

(30) Foreign Application Priority Data
Oct. 13, 2004   (NO) ................... 20044349
Apr. 7, 2005    (NO) ................... 20051721

(51) Int. Cl.
*H04N 7/12*    (2006.01)
(52) U.S. Cl. ............................. 375/240.01
(58) Field of Classification Search ............ 382/233, 382/223; 375/240
See application file for complete search history.

(56) References Cited

U.S. PATENT DOCUMENTS 6,360,024 B1 * 3/2002 Tan et al. ............ 382/260
6,665,346 B1 * 12/2003 Lee et al. ............ 375/240.29
2003/0058944 A1 * 3/2003 MacInnis et al. ...... 375/240.13
2004/0081368 A1   4/2004 Mathew et al.
2005/0013494 A1 * 1/2005 Srinivasan et al. ......... 382/233

OTHER PUBLICATIONS

Wiegand, Thomas. "Draft ITU-T Recommendation and Final Draft International Standard of Joint Video Specification (ITU-T Rec. H.264 | ISO/IEC 14496-10 AVC)". Chap 8 Sec 7. pp. 138-147.*
"Variable Block Size Transform for H264/AVC," *IEEE Transaction on Circuits and Systems for Video Technology*, 13(7), (2003).

* cited by examiner

*Primary Examiner*—Tung Vo
*Assistant Examiner*—Chikaodili E Anyikire
(74) *Attorney, Agent, or Firm*—Oblon, Spivak, McClelland, Maier & Neustadt, P.C.

(57) ABSTRACT

A method in video decoding for reducing blocking artifacts between a first and a second block in a block wise coded video picture by performing a test on pixel lines crossing a boundary and/or an extension of the boundary between the first and the second block and executing a de-blocking filter operation on boundary neighboring pixels if the test indicates artifacts. The method further includes performing the test on a subset of the pixel lines only, and if the test indicates artifacts, executing a de-blocking filter operation on the boundary neighboring pixels in each of the pixel lines crossing the boundary.

4 Claims, 3 Drawing Sheets

| a0 b0 c0 | d0 e0 f0 |
| a1 b1 c1 | d1 e1 f1 |
| a2 b2 c2 | d2 e2 f2 |
| a3 b3 c3 | d3 e3 f3 |
| a4 b4 c4 | d4 e4 f4 |
| a5 b5 c5 | d5 e5 f5 |
| a6 b6 c6 | d6 e6 f6 |
| a7 b7 c7 | d7 e7 f7 |

Figure 3

| | indexA (for α) or indexB (for β) | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

| | indexA (for α) or indexB (for β) | | | | | | | | | | | | | | | | | | | | | | | | | |
|---|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

Figure 4

| | indexA | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| bS = 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bS = 2 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| bS = 3 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 |

| | indexA | | | | | | | | | | | | | | | | | | | | | | | | | |
|---|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| bS = 1 | 1 | 1 | 1 | 1 | 1 | 1 | 1 | 2 | 2 | 2 | 3 | 3 | 3 | 4 | 4 | 4 | 5 | 6 | 6 | 7 | 8 | 9 | 10 | 11 | 13 |  |
| bS = 2 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |  |
| bS = 3 | 1 | 2 | 2 | 2 | 2 | 3 | 3 | 3 | 4 | 4 | 4 | 5 | 6 | 7 | 8 | 9 | 10 | 11 | 13 | 14 | 16 | 18 | 20 | 23 | 25 |  |

Figure 5

DEBLOCKING FILTER

RELATED APPLICATIONS

This application claims priority under 35 U.S.C. § 119 or 365 to Norwegian Application No. 20044349, filed Oct. 13, 2004 and Norwegian Application No. 20051721, filed Apr. 7, 2005. The entire teachings of the above applications are incorporated herein by reference.

BACKGROUND

Transmission of moving pictures in real-time is employed in several applications like e.g. video conferencing, net meetings, TV broadcasting and video telephony.

However, representing moving pictures requires bulk information as digital video which is typically described by representing each pixel in a picture with 8 bits (1 Byte). Such uncompressed video data results in large bit volumes, and cannot be transferred over conventional communication networks and transmission lines in real time due to limited bandwidth.

Thus, enabling real time video transmission requires a large extent of data compression. Data compression may, however, compromise with picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

The most common video coding method is described in the MPEG* and H.26* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on vectors representing movements. The prediction process is typically performed on square block sizes (e.g. 16×16 pixels). Note that in some cases, predictions of pixels based on the adjacent pixels in the same picture rather than pixels of preceding pictures are used. This is referred to as intra prediction, as opposed to inter prediction. Consequently, when the pixels in a block are coded by means of intra prediction, the block is said to be an intra coded.

The residual represented as a block of data (e.g. 4×4 pixels) still contains internal correlation. A well-known method of taking advantage of this is to perform a two dimensional block transform. In H.263 an 8×8 Discrete Cosine Transform (DCT) is used, whereas H.264 uses a 4×4 integer type transform. This transforms 4×4 pixels into 4×4 transform coefficients and they can usually be represented by fewer bits than the pixel representation. Transform of a 4×4 array of pixels with internal correlation will probably result in a 4×4 block of transform coefficients with much fewer non-zero values than the original 4×4 pixel block.

Direct representation of the transform coefficients is still too costly for many applications. A quantization process is carried out for a further reduction of the data representation. Hence the transform coefficients undergo quantization. A simple version of quantisation is to divide parameter values by a number—resulting in a smaller number that may be represented by fewer bits. It should be mentioned that this quantization process has as a result that the reconstructed video sequence is somewhat different from the uncompressed sequence. This phenomenon is referred to as "lossy coding". The outcome from the quantisation part is referred to as quantized transform coefficients.

Entropy coding implies lossless representation of different types of parameters such as overhead data or system description, prediction data (typically motion vectors), and quantized transform coefficients from the quantisation process. The latter typically represent the largest bit consumption.

The coding is performed on block wise parts of the video picture. A macro block consists of several sub blocks for luminance (luma) as well as for chrominance (chroma).

The present video standards H.261, H.262, H.263, H.264/AVC, MPEG1, MPEG2, MPEG4 all use blockbased coding. This means blockbased prediction from previously encoded and decoded pictures as well as blockbased coding of residual signal.

Blockbased coding/decoding has proven to be very efficient. However, one of the drawbacks is that the reconstructed image may have visible artifacts corresponding to the blocks used for prediction and residual signal coding. This phenomenon is usually referred to as blocking or blocking artifacts.

One way of reducing the artifacts known in prior art is to add a post processing filter between the decoder and the display unit at the receiver, an example of which is shown in FIG. 1. The filtering operation takes place right before the presentation of the picture. It is therefore a pure decoder/display issue that is unrelated to what the encoder does. In alternative solution, as shown in FIG. 2, the filter is integrated in the coding loop. This is a more powerful approach, and is the preferred solution in the specification ITU-T Rec. H.264|ISO/IEC 14496-10 AVC, even if it implies that both encoder and decoder need to do the same operations to avoid drift in the reconstructed pictures. However, the integrated solution is quite processor consuming i.a. as it requires a test procedure for each pixel line crossing the block edges to be smoothed.

SUMMARY

The invention is related to decoding of block wise coded video pictures.

The present invention discloses a method in video decoding for reducing blocking artifacts between a first and a second block in a block wise coded video picture by performing a test on pixel lines crossing a boundary and/or an extension of the boundary between the first and the second block and executing a de-blocking filter operation on boundary neighboring pixels if the test indicates artifacts, wherein the method further includes performing the test on a subset of the pixel lines only, and if the test indicates artifacts, executing a de-blocking filter operation on the boundary neighboring pixels in each of the pixel lines crossing the boundary.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates a boundary between two blocks and lines of adjacent pixel positions crossing the boundary.

FIG. 4 shows a look-up table from the H.264/AVC specification for threshold values.

FIG. 5 shows a look-up table from the H.264/AVC specification for clipping values.

DETAILED DESCRIPTION OF THE INVENTION

Figure 1:
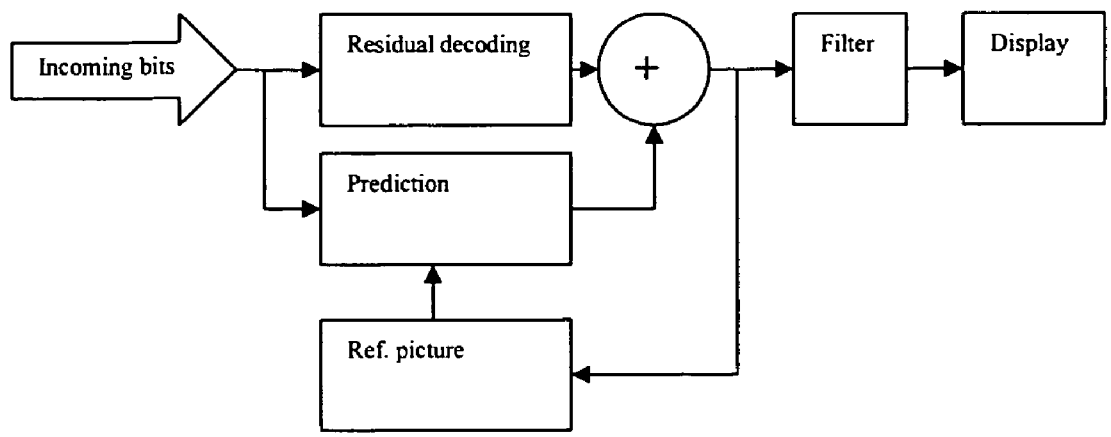
FIG. 1 is a block scheme illustrating a decoder with a post-processing de-blocking filter.
Figure 2:
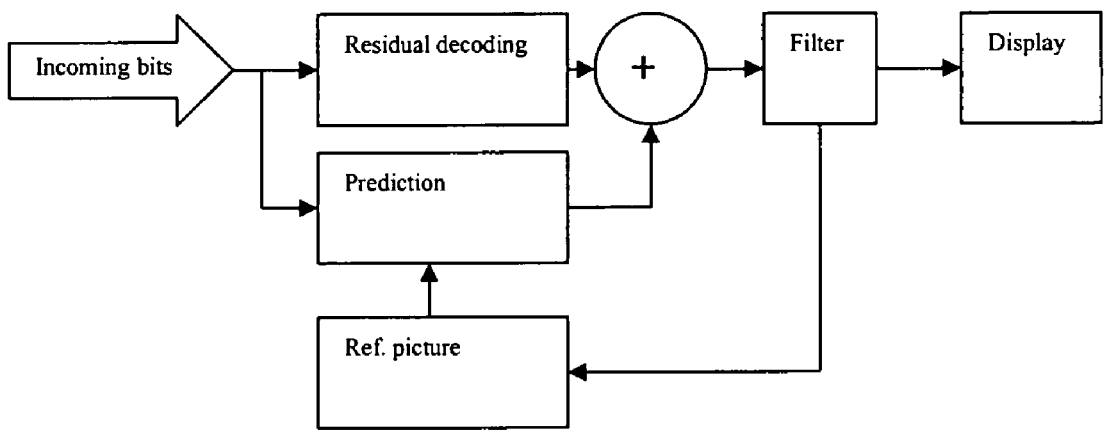
FIG. 2 is a block scheme illustrating a decoder with an integrated de-blocking filter.

The present invention is an improvement of prior art method for removal of blocking and quantization noise. As already mentioned, this method is described in the specification ITU-T Rec. H.264|ISO/IEC 14496-10 AVC, the basics of which are described in the following.

In H.264/AVC an adaptive deblocking filter is applied in the coding loop. This means that further prediction is performed on filtered images. The filter is designed to remove as much as possible of the blocking and quantization noise and still maintain as much of the image content as possible. It is often a challenge to separate quantization noise and picture content. This is why the filter is highly content adaptive and therefore complex concerning computational operations.

In FIG. 3, an edge between two picture blocks is shown. The letters c and d denotes two adjacent pixel positions on each side of the edge, and the other letters denotes the 6 horizontal pixel positions closest to the two first-mentioned pixels. According to H.264/AVC, pixels b c d e may be modified based on the value of each of the pixels and on the characterization of the edge itself. This modification is for equalizing the above-mentioned artifacts. The modification is therefore carried out only when artifacts are likely to occur.

Similar filter operations are performed on all the lines a, b, c, d, e, f. In the following description, the letters will be used without the numbering 0-7. According to H.264, a strength value (Str) is defined for the edge. This strength value reflects whether artifacts are likely to occur between two blocks and depends on whether one or more of the following situations are detected:

a) If any of the two blocks on each side of the boundary is intra coded, i.e. coded based on already coded blocks in the present picture;
b) If any of the two blocks on each side of the boundary includes nonzero transform coefficients;
c) If the size of motion vectors used to predict the blocks on each side of the boundary exceeds a certain threshold.

Furthermore, to each 4×4 block a Quantization Parameter (QP) is assigned. The QP representing the edge is the maximum value of the QPs representing the 2 blocks.

Several QP dependent threshold parameters are used:
α (QP)
β (QP)
γ (QP, Str)

α, β and γ are found in the look-up tables shown in FIGS. 4 and 5. FIG. 4 is the look-up table for determining α, β and FIG. 5 is the look-up table for determining γ, which is a clipping value. Here, indexA and indexB denotes QP, and bS=1, 2, 3 corresponds to criteria c, b, a, respectively, which are listed above. Consequently, the deciding criteria a, b, c, also state the boundary characteristics.

Based on these values, a main test is performed determining whether de-blocking filtering is to be carried out or not.

Filtering is performed only if:

$|c-d|<\alpha(QP)$ and $|b-c|<\beta(QP)$ and $|d-e|<\beta(QP)$

If the above statement is true, then a delta is calculated:

$\Delta=(b-4c+4d-e)/8$

This delta value is then clipped within the range $(-\gamma, \gamma)$. As an example of clipping, if the quantization value is 32 and the characteristic of the boundary comply with criterion b, which corresponds to bS=2, the table indicates that γ is 2. This implies that delta should be clipped within the interval $\{-2,2\}$. I.e. when delta is greater than 2, delta is assigned the value 2, when delta is less than −2, delta is assigned the value −2, and when delta lies within $\{-2,2\}$, delta remains unchanged.

Delta is then used to calculate modified values:

$c'=c+\Delta$ $d'=d-\Delta$

An additional test is performed to decide if b also is to be corrected:

$|a-c|<\beta(QP)$

If this is true, then a value δ is calculated:

$\delta=(2a-4b+c+d)/2$

The value is then further clipped the value to the range $(-\gamma', \gamma')$, wherein γ' is a slight modification of γ. A modification of b is then calculated by means of δ:

$b'=b+\delta$

The test and calculation is similar for e:

$|c-f|<\beta(QP)$:

If this is true another value δ is calculated:

$\delta=(2f-4e+c+d)/2$

The value is then further clipped to the range $(-\gamma', \gamma')$. A modification of e is then calculated by means of δ:

$e'=e+\delta$

The present invention is based on the standardized method described above, but discloses a simplification resulting in a reduction in complexity without compromising too much with the qualitative result of the de-blocking operation.

Two embodiments of the invention will now described by an illustrative example.

The main difference compared to prior art, is that the decision test for filtering/no-filtering preformed on one or a subset of lines crossing the boundary between two macro blocks applies to all the lines crossing the same boundary. If more than one "decision line" is involved in the decision test, as will follow from the description bellow, when considering the criterions a) b) c) above, not only two, but four blocks must be taken into account. The "decision lines" will cross two different boundaries, and hence involving four blocks.

As a first embodiment of the present invention, the second line in the FIG. 3 is selected as the "decision line" for the four lines 0-3 crossing the boundary.

Then, filtering of all 4 edge lines are performed if:

$$d=(|a1-2b1+c1|+|d1-2e1+f1|)<\beta(QP)$$

Otherwise no filtering is performed.

As opposed to prior art, the test for one line applies for all the lines crossing the block boundary. Thus, the value β is not necessarily determined in the same way as the β earlier described herein. E.g. other look-up tables than those depicted in FIGS. 4 and 5 may be used to determine β.

In a second embodiment of the present invention, the third and the sixth line of in FIG. 4 in combination are used as the "decision lines" for all the eight lines 0-7 crossing the boundary.

Then, filtering of all 8 edge lines are performed if:

$$d'=(|a2-2b2+c2|+|d2-2e2+f2|+|a5-2b5+c5|+|d5-2e5+f5|)<\beta'(QP)$$

Otherwise no filtering is performed. β' may also be determined in still a another way than in prior art. A typical relation to β of the first embodiment would be β'=2 β.

Further, if the above tests on the "decision line" is true, a separate calculation is performed for each of the line for deriving delta and a corresponding corrected pixel values. This can generally be expressed as in the following, using the same notation as for the description of prior art:

$$\Delta=(a-b-2c+2d+e-f)/4$$

Alternatively, for accommodating the calculation to the state of the art processor commonly used in codecs for videoconferencing, the expression above could be transformed to:

$$\Delta = \frac{d+\frac{a+e}{2}}{2} - \frac{c+\frac{b+f}{2}}{2}$$

The delta value is clipped to the value range $(-\gamma, \gamma)$ $$b'=b+\Delta/2$$

$$c'=c+\Delta$$

$$d'=d-\Delta$$

$$e'=e-\Delta/2$$

Simulations comparing the prior art H.264 filter and a filter according to the present invention has shown a decreased requirement for computational resources of about 50%, with practically the same subjective image quality.

The description herein has been related to filtering of block artifacts in the horizontal direction, i.e. filtering pixels on both sides of vertical block boundaries. However, the present invention is directly applicable to filtering of block artifacts in vertical direction. This implies a 90° rotation of the pixels notation in FIG. 3.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method in video decoding for reducing blocking artifacts between a first and a second block in a block wise coded video picture by performing a first test of adjacent blocks and a second test of pixel lines crossing a boundary and/or an extension of the boundary between the first and the second block and executing a de-blocking filter operation on boundary neighboring pixels if the test indicates artifacts, performing the second test on a subset S of the pixel lines only, and if the test indicates artifacts, executing the de-blocking filter operation on the boundary neighboring pixels in each of the pixel lines crossing the boundary, wherein performing the second test on said subset of pixel lines only includes testing the following relation for said subset of pixel lines:

$$\sum_{i \in S}(|a_i - 2b_i + c_i| + |d_i - 2e_i + f_i|) < \beta'\ (QP)$$

wherein a is the third closest pixel on the left hand side of the boundary and/or the extension of the boundary, b is the second closest pixel on the left hand side of the boundary and/or the extension of the boundary, c is the closest pixel on the left hand side of the boundary and/or an extension of the boundary, d is the closest pixel on the right hand side of the boundary and/or an extension of the boundary, e is the second closest pixel on the right hand side of the boundary and/or an extension of the boundary and f is the third closest pixel on the right hand side of the boundary and/or an extension of the boundary, i is the line number of lines in the subset S and β'(QP) is a threshold value dependent on a first quantization parameter for the video coding, if the relation is true, executing the following re-calculation operation of the neighboring pixels on each of the pixel lines crossing the boundary:

$$\Delta=(a-b-2c+2d+e-f)/4$$

clipping within a value range $(-\gamma, \gamma)$, wherein γ is a second quantization parameter found in a second look-up table dependent on the first quantization parameter and a strength value for the boundary, $$b'=b+\Delta/2$$

$$c'=c+\Delta$$

$$d'=d-\Delta$$

$$e'=e-\Delta/2$$

wherein b', c', d' and e' are re-calculated values of corresponding original pixels values.

2. A method in video decoding for reducing blocking artifacts between a first and a second block in a block wise coded video picture by performing a first test of adjacent blocks and a second test of pixel lines crossing a boundary and/or an extension of the boundary between the first and the second block and executing a de-blocking filter operation on boundary neighboring pixels if the test indicates artifacts. performing the second test on a subset S of the pixel lines only, and if the test indicates artifacts, executing the de-blocking filter operation on the boundary neighboring pixels in each of the pixel lines crossing the boundary, wherein performing the second test on said subset of pixel lines only includes testing the following relation for said subset of pixel lines:

$$\sum_{i \in S} (|a_i - 2b_i + c_i| + |d_i - 2e_i + f_i|) < \beta' \ (QP)$$

wherein a is the third closest pixel on the upper side of the boundary and/or the extension of the boundary, b is the second closest pixel on the upper side of the boundary and/or the extension of the boundary, c is the closest pixel on the upper side of the boundary and/or an extension of the boundary, d is the closest pixel on the lower side of the boundary and/or an extension of the boundary, e is the second closest pixel on the lower side of the boundary and/or an extension of the boundary and f is the third closest pixel on the lower side of the boundary and/or an extension of the boundary, i is the line number of lines in the subset S and β(QP) is a threshold value dependent on a first quantization parameter for the video coding, if the relation is true, executing the following re-calculation operation of the neighboring pixels on each of the pixel lines crossing the boundary:

$\Delta=(a-b-2c+2d+e-f)/4$ clipping within a value range $(-\gamma, \gamma)$, wherein y is a second quantization parameter found in a second look-up table dependent on the first quantization parameter and a strength value for the boundary, $b'=b+\Delta/2$ $c'=c+\Delta$ $d'=d-\Delta$ $e'=e-\Delta/2$ wherein b', c', d' and e' are re-calculated values of corresponding original pixels values.

3. A method in video decoding for reducing blocking artifacts between a first and a second block in a block wise coded video picture by performing a test of pixel lines crossing a boundary and/or an extension of the boundary between the first and the second block and executing a de-blocking filter operation on boundary neighboring pixels if the test indicates artifacts, performing the test on one certain of the pixel lines, and if the test indicates artifacts, executing the de-blocking filter operation on the boundary neighboring pixels in each of the pixel lines crossing the boundary, wherein performing the test on said certain pixel line includes testing the following relation for said pixel line:

$(|a-2b+c|+|d-2e+f|)<\beta(QP)$ wherein a is the third closest pixel on the left hand side of the boundary and/or the extension of the boundary, b is the second closest pixel on the left hand side of the boundary and/or the extension of the boundary, c is the closest pixel on the left hand side of the boundary and/or an extension of the boundary, d is the closest pixel on the right hand side of the boundary and/or an extension of the boundary, e is the second closest pixel on the right hand side of the boundary and/or an extension of the boundary and f is the third closest pixel on the right hand side of the boundary and/or an extension of the boundary, and β(QP) is a threshold value dependent on a first quantization parameter for the video coding, if the relation is true, executing the following re-calculation operation of the neighboring pixels on each of the pixel lines crossing the boundary:

$\Delta=(a-b-2c+2d+e-f)/4.$ clipping within a value range $(-\gamma, \gamma)$, wherein y is a second quantization parameter found in a second look-up table dependent on the first quantization parameter and a strength value for the boundary, $b'=b+\Delta/2$ $c'=c+\Delta$ $d'=d-\Delta$ $e'=e-\Delta/2$ wherein b', c', d' and e' are re-calculated values of corresponding original pixels values.

4. A method in video decoding for reducing blocking artifacts between a first and a second block in a block wise coded video picture by performing a test of pixel lines crossing a boundary and/or an extension of the boundary between the first and the second block and executing a de-blocking filter operation on boundary neighboring pixels if the test indicates artifacts, performing the test on one certain of the pixel lines, and if the test indicates artifacts, executing the de-blocking filter operation on the boundary neighboring pixels in each of the pixel lines crossing the boundary, wherein performing the test on said certain pixel line includes testing the following relation for said pixel line:

$(|a-2b+c|+|d-2e+f|)<\beta(QP)$ wherein a is the third closest pixel on the upper side of the boundary and/or the extension of the boundary, b is the second closest pixel on the upper side of the boundary and/or the extension of the boundary, c is the closest pixel on the upper side of the boundary and/or an extension of the boundary, d is the closest pixel on the lower side of the boundary and/or an extension of the boundary, e is the second closest pixel on the lower side of the boundary and/or an extension of the boundary and f is the third closest pixel on the lower side of the boundary and/or an extension of the boundary, and β(QP) is a threshold value dependent on a first quantization parameter for the video coding, if the relation is true, executing the following re-calculation operation of the neighboring pixels on each of the pixel lines crossing the boundary:

$\Delta=(a-b-2c+2d+e-f)/4$ clipping within a value range $(-\gamma, \gamma)$, wherein γ is a second quantization parameter found in a second look-up table dependent on the first quantization parameter and a strength value for the boundary, $b'=b+\Delta/2$ $c'=c+\Delta$ $d'=d-\Delta$ $e'=e-\Delta/2$ wherein b', c', d' and e' are re-calculated values of corresponding original pixels values.

* * * * *